US012681954B2

(12) United States Patent  
Xu et al.

(10) Patent No.: US 12,681,954 B2  
(45) Date of Patent: Jul. 14, 2026

(54) SPACE PARTITIONING METHOD FOR DATABASE TABLE, DEVICE AND STORAGE MEDIUM

(71) Applicant: HANGZHOU HIKVISION DIGITAL TECHNOLOGY CO., LTD., Hangzhou (CN)

(72) Inventors: Zhiwei Xu, Hangzhou (CN); Hui Wang, Hangzhou (CN); Yongjian He, Hangzhou (CN); Bingjie Li, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 1099 days.

(21) Appl. No.: 17/288,897

(22) PCT Filed: Oct. 25, 2019

(86) PCT No.: PCT/CN2019/113310  
§ 371 (c)(1),  
(2) Date: Apr. 26, 2021

(87) PCT Pub. No.: WO2020/083381  
PCT Pub. Date: Apr. 30, 2020

(65) Prior Publication Data

US 2022/0004564 A1 Jan. 6, 2022  
US 2023/0153326 A9 May 18, 2023

(30) Foreign Application Priority Data

Oct. 25, 2018 (CN) .......................... 201811253560.2

(51) Int. Cl.  
G06F 16/27 (2019.01)  
G06N 3/04 (2023.01)

(52) U.S. Cl.  
CPC ............. G06F 16/278 (2019.01); G06N 3/04 (2013.01)

(58) Field of Classification Search  
CPC ......... G06F 16/278; G06F 16/27; G06N 3/04; G06N 3/0464; G06N 3/0475; G06N 3/0495; G06N 3/0499  
See application file for complete search history.

(56) References Cited

U.S. PATENT DOCUMENTS

| | | | | |
|---|---|---|---|---|
| 5,970,495 A | * | 10/1999 | Baru ..................... | G06F 9/5088 707/999.102 |
| 8,108,243 B2 | * | 1/2012 | Solotorevsky ......... | G06Q 30/02 705/7.29 |

(Continued)

FOREIGN PATENT DOCUMENTS

| | | | | |
|---|---|---|---|---|
| CN | 105701027 A | * | 6/2016 | ........... G06F 12/023 |
| CN | 107730087 A | | 2/2018 | |
| JP | 2017157213 A | | 9/2017 | |

OTHER PUBLICATIONS

International search report of PCT application No. PCT/CN2019/113310 issued on Feb. 20, 2020.

*Primary Examiner* — Vaishali Shah  
(74) *Attorney, Agent, or Firm* — Knobbe, Martens, Olson & Bear, LLP

(57) ABSTRACT

Disclosed is a space partitioning method for a database table, including: determining a first data amount within a first time period and a second data amount within a second time period of the database table; calling a target network model, inputting the first data amount and the second data amount into the target network model, and outputting a third data amount within the target time period, wherein the target network model is configured to predict a data amount of a next time period based on data amounts of a previous time period and a current time period; and determining a number of target (Continued)

Acquiring a plurality of groups of data by pre-partitioning, based on a time stamp of data in a database table, the data in the database table according to a predetermined period length — 201

Determining a first data amount within a first time period and a second data amount within a second time period of the database table, wherein the first time period and the second time period are prior to a target time period corresponding to data to be stored — 202

Calling a target network model, inputting the first data amount and the second data amount into the target network model, and outputting a third data amount within the target time period, wherein the target network model is configured to predict a data amount of a next time period based on data amounts of a previous time period and a current time period — 203

Determining a number of target regions based on the third data amount within the target time period — 204

Partitioning, based on the number of target regions, a space in the database table configured to store the data to be stored — 205 regions based on the third data amount within the target time period, and partitioning, based on the number of target regions, a space in the database table configured to store the data to be stored.

12 Claims, 3 Drawing Sheets

(56)                    References Cited

U.S. PATENT DOCUMENTS

| | | | |
|---|---|---|---|
| 9,934,259 B2 * | 4/2018 | Leonard | .............. G06F 16/2477 |
| 10,185,893 B2 | 1/2019 | Townsend et al. | |
| 10,852,998 B2 * | 12/2020 | Shekhar | .................. G06F 16/00 |
| 10,909,114 B1 * | 2/2021 | Virtuoso | ............. G06F 16/2282 |
| 2012/0150489 A1 * | 6/2012 | Dhurandhar | ............ G06F 17/18 |
| | | | 702/179 |
| 2015/0254285 A1 * | 9/2015 | Achar | ................... G06F 16/215 |
| | | | 707/692 |
| 2017/0249534 A1 | 8/2017 | Townsend et al. | |
| 2019/0140667 A1 * | 5/2019 | Ren | ................... H03M 13/3761 |
| 2019/0146849 A1 * | 5/2019 | Leonard | ................. G06F 9/542 |
| | | | 718/104 |

* cited by examiner

Time period

SPACE PARTITIONING METHOD FOR DATABASE TABLE, DEVICE AND STORAGE MEDIUM

CROSS-REFERENCE TO RELATED APPLICATIONS

This application is a U.S. National Phase Application of International Application No. PCT/CN2019/113310, filed on Oct. 25, 2019, which claims priority to Chinese Patent Application No. 201811253560.2, filed on Oct. 25, 2018 and entitled "DATABASE TABLE AREA SEGMENTATION METHOD AND APPARATUS, DEVICE, AND STORAGE MEDIUM," the contents of each of which is incorporated by reference herein in its entirety.

TECHNICAL FIELD

Embodiments of the present disclosure relate to the field of database technologies and particularly, relate to space partitioning method and apparatus for a database table, and a device and a storage medium thereof.

BACKGROUND

With the development of database technologies, database tables can be used to store data. In a business scenario using a database table to store the data, the data amount stored in the database table gradually increases over time. To reduce the storage pressure of the database, it is usually necessary to partition a space of the database table, so as to store the data in the database tables in units of regions formed by partitioning.

SUMMARY

Embodiments of the present disclosure provide a space partitioning method and apparatus for a database table, and a device and a storage medium thereof. The technical solutions are as follows.

In a first aspect, a space partitioning method for a database table is provided. The method includes:

determining a first data amount within a first time period and a second data amount within a second time period of the database table, wherein the first time period and the second time period are prior to a target time period corresponding to data to be stored;

calling a target network model, inputting the first data amount and the second data amount into the target network model, and outputting a third data amount within the target time period, wherein the target network model is configured to predict a data amount of a next time period based on data amounts of a previous time period and a current time period; and determining a number of target regions based on the third data amount within the target time period, and partitioning, based on the number of target regions, a space in the database table configured to store the data to be stored.

Optionally, the first and second time periods are adjacent ones, and the first time period is a previous time period of the target time period.

Optionally, before determining the first data amount within the first time period and the second data amount within the second time period of the database table, the method further includes:

acquiring a plurality of groups of data by pre-partitioning, based on a time stamp of data in the database table, the data in the database table according to a predetermined period length; and determining the first data amount within the first time period and the second data amount within the second time period of the database table includes:

determining the first data amount within the first time period and the second data amount within the second time period of the database table by counting a data amount in the first time period and counting a data amount in the second time period from the plurality of groups of data.

Optionally, determining the number of target regions based on the third data amount within the target time period includes:

determining the number of target regions by formula:

$$k = \lceil \frac{n}{m} \rceil$$

based on the third data amount within the target time period;

wherein k is the number of target regions, n is the third data amount within the target time period, m indicates a maximum storage capacity of a single region, and "⌈ ⌉" represents a rounding-up operation.

Optionally, the target network model is obtained by training a neural network model based on a data amount within a plurality of time periods and a data amount of one time period upon elapse of each of the plurality of time periods.

In a second aspect, a space partitioning device for a database table is provided. The device includes:

a processor and a memory configured to store a computer program, wherein the processor, when running the computer program, is caused to perform a space partitioning method for a database table including:

determining a first data amount within a first time period and a second data amount within a second time period of the database table, wherein the first time period and the second time period are prior to a target time period corresponding to data to be stored;

calling a target network model, inputting the first data amount and the second data amount into the target network model, and outputting a third data amount within the target time period, wherein the target network model is configured to predict a data amount of a next time period based on data amounts of a previous time period and a current time period; and determining a number of target regions based on the third data amount within the target time period, and partitioning, based on the number of target regions, a space in the database table configured to store the data to be stored.

Optionally, the first and second time periods are adjacent ones, and the first time period is a previous time period of the target time period.

Optionally, before determining the first data amount within the first time period and the second data amount within the second time period of the database table, the method further includes:

acquiring a plurality of groups of data by pre-partitioning, based on a time stamp of data in the database table, the data in the database table according to a predetermined period length; and determining the first data amount within the first time period and the second data amount within the second time period of the database table includes:

determining the first data amount within the first time period and the second data amount within the second time period of the database table by counting a data amount in the first time period and counting a data amount in the second time period from the plurality of groups of data.

Optionally, determining the number of target regions based on the third data amount within the target time period includes:

determining the number of target regions by formula:

$$k = \lceil \frac{n}{m} \rceil$$

based on the third data amount within the target time period;

wherein k is the number of target regions, n is the third data amount within the target time period, m indicates a maximum storage capacity of a single area, and "⌈ ⌉" represents a rounding-up operation.

Optionally, the target network model is obtained by training a neural network model based on a data amount within a plurality of time periods and a data amount of one time period after each of the plurality of time periods.

In a third aspect, a non-volatile computer-readable storage medium storing instructions therein is provided, wherein the instructions, when executed by a processor, cause the processor to perform the steps of the method according to the first aspect.

In a fourth aspect, a computer program product including at least one instructions therein is provided, wherein the at least one instruction, when executed by a computer, causes the computer to perform the steps of the method according to the first aspect.

In a fifth aspect, a computer device including a processor and a memory storing a computer program is provided, wherein the processor, when running the computer program, is caused to perform the method according to the first aspect.

BRIEF DESCRIPTION OF DRAWINGS

To describe the technical solutions in the embodiments of the present disclosure more clearly, the drawings required for the description of the embodiments are briefly introduced below. Obviously, the accompanying drawings in the following description show merely some embodiments of the present disclosure, and a person of ordinary skill in the art may still derive other drawings from these accompanying drawings without creative efforts.

DESCRIPTION OF EMBODIMENTS

For clearer descriptions of the objectives, technical solutions, and advantages of the present disclosure, the embodiments of the present disclosure are described in detail below with reference to the accompanying drawings.

Prior to detailed introduction of the embodiments of the present disclosure, the terms, application scenarios and implementation environments involved in the embodiments of the present disclosure are briefly introduced.

First, the terms involved in the embodiments of the present disclosure are introduced.

Three-sigma refers to a method for eliminating error data, and may also be called Laida criterion.

Long short-term memory (LSTM) network model is a time recurrent neural network (RNN), and essentially, is a threshold RNN. The threshold RNN herein means that compared with the RNN, the LSTM network additionally includes three gates: an input gate, a forget gate and an output gate. Through the three gates, information that needs to be forgotten and output in the LSTM network model is limited. Specifically, the LSTM network model internally includes a plurality of units, each of which includes the above three gates. Furthermore, each unit further includes some weights and functions (such as a tan h function), wherein the weight of each unit depends on the context, rather than a fixed value. The LSTM network model internally transmits information through a cell state, and controls the discard or addition of information through the gates. In an embodiment, each unit is constructed with a sigmoid function which may be used to determine whether there is information that needs to be forgotten in this unit according to the output of the previous unit and the input of this unit. The forget gate generates values within an interval of [0, 1] to control the information that needs to be forgotten. In addition, values within the interval of [0, 1] are generated by the tan h function to control whether new information needs to be added. After that, a filtering degree of a current cell state is controlled by the output gate, that is, the information that needs to be output is integrated; and the tan h function is intended to control the output of the information, wherein values of the output information are in the interval of [0, 1].

Figure 1:
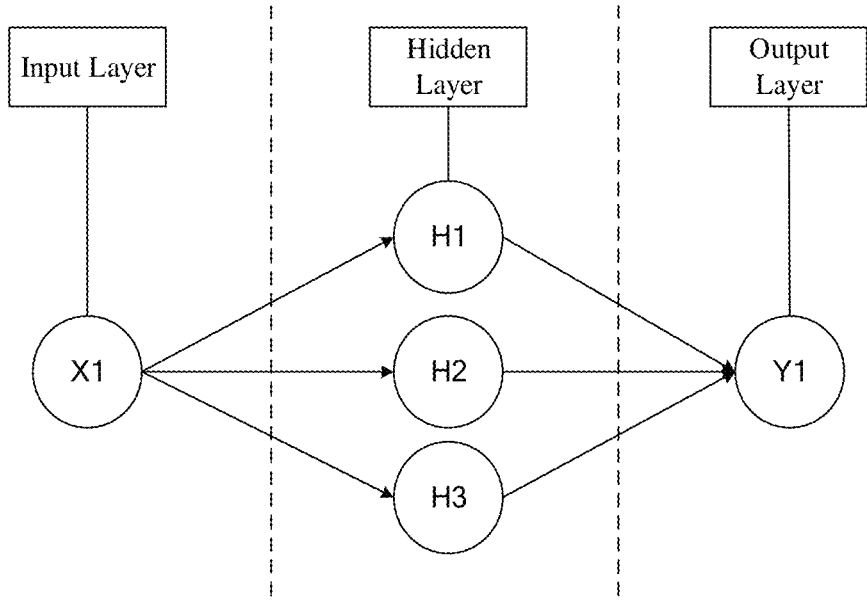
FIG. 1 is a schematic structural diagram showing an LSTM network model according to an embodiment.

Next, the internal structure of the LSTM network model is introduced. The LSTM network model generally includes a plurality of layers, each of which includes at least one node. Referring to FIG. 1 which is a schematic structural diagram of an LSTM network model according to an example embodiment, the LSTM network model includes an input layer, a hidden layer, and an output layer, wherein the above units are usually located in the hidden layer. In the LSTM network model, the input layer includes a node X1, the hidden layer includes nodes H1, H2, and H3, and the output layer includes a node Y1. In each time step, the input data can be processed by each layer in the network model, wherein one time step may be understood as a time period for processing data correspondingly.

It should be noted that as the LSTM network model has a memory function, it can predict data in the next time period based on data in the previous time period and data in the current time period.

Secondly, the application scenarios involved in the embodiments of the present disclosure are briefly introduced.

In some usage scenarios of database tables, space partitioning is necessary generally to avoid huge storage pressure to a database caused by using a single space to store data. At present, databases such as HBase are provided with a plurality of sets of partitioning policies. However, data migration may be required after the database tables are partitioned by using the plurality of sets of the partitioning policies, adversely affecting the storage performance. In addition, the plurality of sets of the partitioning policies are independent of time factors, which leads to the fact that the partitioned data cannot be aggregated in a certain period of time, thereby greatly reducing the efficiency of other subsequent operations such as data query and deletion. For this reason, the embodiments of the present disclosure provide a space partitioning method for a database table, which can solve the problems existing in the partitioning policy provided by the database per se. For the detailed process of the method, reference may be made to the embodiment shown in FIG. 2 below.

Finally, the implementation environments related to the embodiments of the present disclosure are briefly introduced.

The space partitioning method according to the embodiments of the present disclosure may be performed by a computer device which may be configured to manage a database table, for example, performing space partitioning on the database table, and allocating each region obtained after the partitioning to a respective storage node of the database. It should be noted that in some embodiments, one storage node may be equivalent to a storage device, that is, the storage node may also be understood as the storage device.

In some embodiments, the computer device may be a tablet computer, a desktop computer, a notebook computer, a portable computer, or the like, which is not limited in the embodiments of the present disclosure.

After introducing the terms, the application scenarios and the implementation environments involved in the embodiments of the present disclosure, the method according to the embodiments of the present disclosure are described in detail with reference to the accompanying drawings.

At present, the database is provided with a database table partitioning policy, and a storage device can partition a database table according to the partitioning policy, specifically, which is implemented in that the database table usually involves a plurality of storage intervals, which corresponds to an interval label range. This partitioning policy is generally intended to partition a space by taking a middle value of the interval label range as a partitioning point. For example, if interval labels of a plurality of storage intervals of one database table include 1 to 100, the database table is partitioned into a first region and a second region by taking the middle label 50 as the partitioning point, wherein the interval labels of the storage interval in the first region include 1 to 50, and the interval labels of the storage interval in the second region include 51 to 100.

As the data is stored in the database table in units of regions when the amount of data is larger, and the storage space allocated for a single region in the storage device is limited, as a result, in the space partitioning for the database table, if the data amount in a partitioned region reaches an upper limit of the storage space corresponding to this region, data migration may be required. For example, when the data amount in the first region reaches the upper limit of the storage space corresponding to the first region, if the storage device where the first region is located has no other available storage space, it is necessary to migrate the data in the first region from the storage device where the first region is located to another storage device which allocates a storage space for the data in the first region. Thus, the storage performance of the database is reduced.

Figure 2:
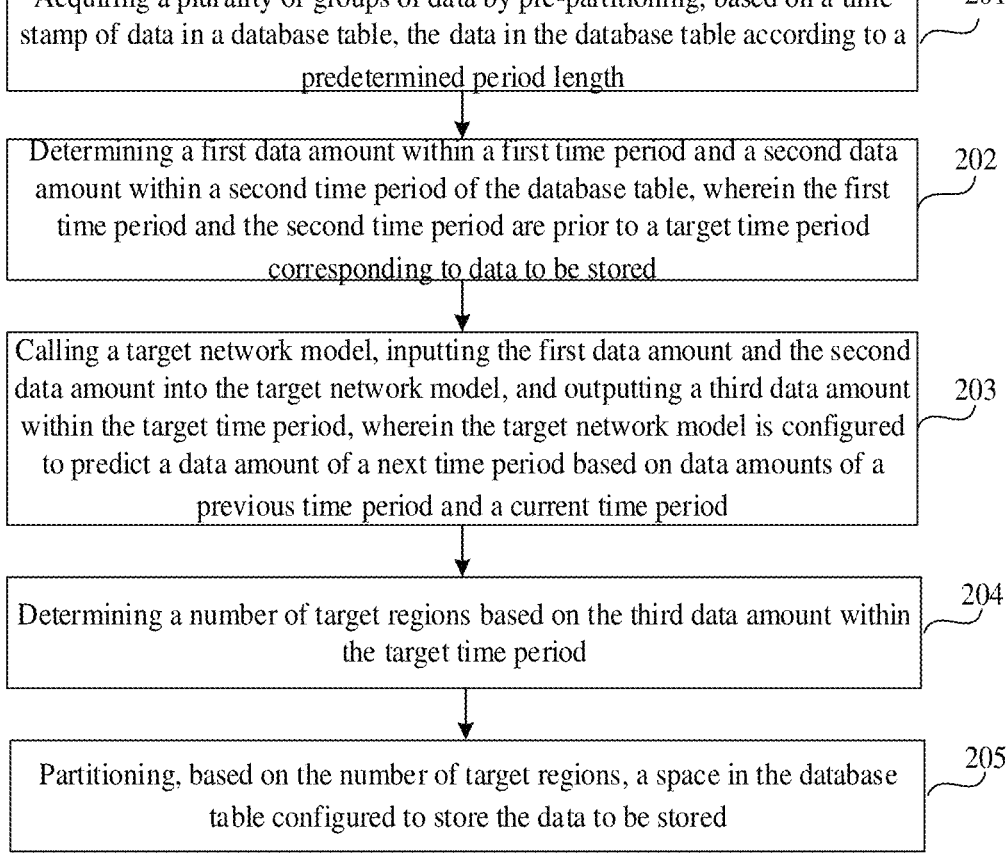
FIG. 2 is a flowchart showing a space partitioning method for a database table according to an embodiment.

Embodiments of the present disclosure provide a space partitioning method. Referring to FIG. 2 which is a flowchart showing a space partitioning method for a database table according to an example embodiment, the method may be performed by a computer device. The method includes the following implementation steps.

In step 201, the computer device acquires a plurality of groups of data by pre-partitioning, based on a time stamp of data in a database table, the data in the database table according to a predetermined period length.

In the embodiment of the present disclosure, a space configured to store the data to be stored in the database table is partitioned based on the data stored in the database table. Before partitioning the space configured to store the data to be stored in the database, the database table is initialized first, that is, the stored data is pre-partitioned. During initialization, as all the data stored in the database table have corresponding time stamps, the data stored in the database table may be pre-partitioned according to the predetermined period length. It may also be understood as pre-partitioning the space where the data is stored in the database table. In fact, the pre-partitioning means grouping the stored data, such that the plurality of groups of data can be obtained. Each group of data corresponds to a pre-partitioned region, and corresponds to a time period.

The predetermined period length is customized by a user according to actual needs, or is defaulted by the computer device. For example, the predetermined period length is several days, weeks or months, which is not limited by the embodiments of the present disclosure.

For convenience of understanding, an example in which the predetermined period length is set to be one week is taken for illustration here. The data stored in the database table can be partitioned into a plurality of groups with one week as the time period as each datum stored in the database table usually has the time stamp; and each group of data is stored in a region acquired by pre-partitioning the space. In this way, each region acquired by pre-partitioning the space corresponds to one time period. For example, a time range corresponding to the region obtained by the pre-partitioning may be 20180601-20180607, 20180608-20180614, 20180615-20180621, etc. Taking 20180601 as an example for illustration, 2018 represents the year and 0601 represents June 1. Further, the region corresponding to 20180601-20180607 is configured to store the data in the database table whose time stamp is within this time period.

It is worth mentioning that the data in the database table is pre-partitioned according to the time granularity. In this way, when the data in the database need to be queried or deleted later, the data in a certain time period can be quickly obtained from the corresponding region obtained by the pre-partitioning according to the time period in which the data to be operated falls, thereby improving the data operation efficiency. In addition, the data stored in the database table are grouped in advance, which can facilitate the rapid counting of the data amount in a certain time period later.

Further, considering that when the data in a region is stored on one storage node, the data can only be read from the one storage node during reading, a load balance effect is poorer. Therefore, after data of the plurality of pre-partitioned regions is obtained by the pre-partitioning, each pre-partitioned region may be further partitioned. Specifically, each pre-partitioned region is further partitioned according to the number of storage nodes configured to store the data. For example, when the number of storage nodes in the database is three, each pre-partitioned region obtained by the partitioning is further partitioned into three sub-regions;

and each sub-region in the three sub-regions is distributed to each of the three storage nodes. In this way, when the data in each pre-partitioned region needs to be read later, the data can be read from the three storage nodes respectively, thereby ensuring the load balance.

It should be noted that for the above wording that the plurality of pre-partitioned regions are acquired by pre-partitioning the data stored in the database table, as the stored data is allocated in one region, after grouping the data, each group of data is stored in a separate region. Thus, grouping is equivalent to pre-partitioning the space. Similarly, for the wording that each pre-partitioned region needs to be further partitioned, as each group of data is stored in one pre-partitioned region, after the data in the pre-partitioned regions is grouped again, the data in each sub-group is stored in a separate region, which is equivalent to further partitioning the pre-partitioned region.

Further, in order to distinguish the all sub-regions obtained after each pre-partitioned region is further partitioned, a hash value is added at the end of the time period corresponding to each pre-partitioned region. This hash value is intended to distinguish the different sub-regions corresponding to the same pre-partitioned region. For example, if three sub-regions are obtained by further partitioning the pre-partitioned region corresponding to the time period 20180601-20180607, time ranges corresponding to the three sub-regions may be recorded as 20180601-2018060101, 2018060101-2018060102, and 2018060102-20180607, respectively. The last two numbers of 2018060101 are the added hash values. Similarly, the last two numbers of 2018060102 are also the added hash values.

It should be noted that step 201 is an optional step. That is, in some embodiments, step 202 may be directly executed without step 201, which is not limited in the embodiments of the present disclosure.

In step 202, the computer device determines a first data amount within a first time period and a second data amount within a second time period of the database table, wherein the first time period and the second time period are prior to a target time period corresponding to data to be stored.

In some embodiments, when determining that the current time reaches the target time period, the computer device may perform the operation of determining the first data amount within the first time period and the second data amount within the second time period of the database table. For example, if the target time period is from Sep. 1, 2018 to Sep. 7, 2018, the computer device performs this operation on Aug. 31, 2018.

In a possible embodiment, the first and second time periods are adjacent ones, and the first time period is a previous time period of the target time period. For example, if a time series corresponding to the target time period is t+1, a time series corresponding to the first time period is t, and a time series corresponding to the second time period is t−1. In this way, the accuracy of predicting a third data amount within the target time period can be guaranteed later.

Further, the specific process of determining the first data amount within the first time period and the second data amount within the second time period of the database table includes: determining the first data amount within the first time period and the second data amount within the second time period of the database table by counting a data amount in the first time period and counting a data amount in the second time period from a plurality of groups of data.

For example, if the target time period is 20180901-20180907, that is, the data to be stored is from Sep. 1, 2018 to Sep. 7, 2018, the first time period is 20180825-20180831, and the second time period is 2010818-20180824. That is, the computer device, based on the plurality of groups of the data after grouping, counts the data amount from Aug. 25, 2018 to Aug. 31, 2018 to obtain the first data amount, and counts the data amount from Aug. 18, 2018 to Aug. 24, 2018 to obtain the second data amount.

An example in which the first and second time periods are adjacent ones and the first time period is the previous time period of the target time period is taken for illustration here. In another embodiment, the first time period and the second time period may not be adjacent to each other, or the first time period may not be the previous time period of the target time period. For example, taking the above example for illustration, if the target time period is 20180901-20180907, the first time period may be selected as 2010818-20180824, and the second time period may be selected as 20180607-20180613.

In step 203, the computer device calls a target network model, inputs the first data amount and the second data amount into the target network model, and outputs a third data amount within the target time period, wherein the target network model is configured to predict a data amount of a next time period based on data amounts of a previous time period and a current time period.

For example, if a model structure of the target network model is as shown in FIG. 1, the first data amount and the second data amount are input into the target network model, and then sequentially processed by the input layer, the hidden layer, and the output layer to output the third data amount which is a predicted data amount of the data to be stored.

Further, the target network model is obtained by training, based on a data amount within a plurality of time periods and a data amount of one time period after each of the plurality of time periods, a neural network model.

That is, before calling the target network model, it is generally necessary to perform training to obtain the target network model. In the training process, the data amount within the plurality of time periods and the data amount of one time period after each of the plurality of time periods can be acquired. After that, based on the data amount within the plurality of time periods and the data amount of one time period after each of the plurality of time periods, the neural network model is trained to obtain the target network model.

As an example, the time period after each of the plurality of time periods is one time period adjacent to each time period. For example, if the time series corresponding to each of the time periods is t, the time series corresponding to one time period after each of the plurality of time periods is t+1.

Next, the training process is introduced. The computer device acquires a plurality of pieces of data, groups the data according to a time stamp of the acquired data and the predetermined period length, and counts the data amount of each group of data to obtain a data amount within a plurality of time periods and a data amount of one time period after each of the plurality of time periods. The acquired data is converted and preprocessed, and the processed data is input into the neural network model for iterative training to obtain the target network model.

When acquiring the data, data with similar business types, similar data structures and similar time distribution may be selected. For example, the selected data is shown in Table 1.

TABLE 1

| Date | Data Size |
| --- | --- |
| 2016 Jul. 1 | 1.3 G |
| 2016 Jul. 2 | 1.4 G |
| 2016 Jul. 3 | 1.2 G |
| 2016 Jul. 4 | 0.8 G |
| 2016 Jul. 5 | 1.5 G |
| 2016 Jul. 6 | 1.3 G |
| 2016 Jul. 7 | 1.2 G |
| 2016 Jul. 8 | 1.0 G |
| 2016 Jul. 9 | 0.6 G |
| 2016 Jul. 10 | 0.8 G |
| 2016 Jul. 11 | 1.7 G |
| 2016 Jul. 12 | 1.7 G |
| 2016 Jul. 13 | 1.6 G |
| 2016 Jul. 14 | 1.5 G |
| . . . | . . . |

If the database adopts compressed storage, the data size in Table 1 is the compressed data size. After that, the three-sigma rule is adopted to detect errors, so as to eliminate bad data, such that the data is distributed in the range of (u−3a, u+3a). That is, the data distributed outside the range is eliminated. Herein, u represents a mean of the data, and a represents a standard deviation of the data. Further, the computer device counts the acquired data with a predetermined period length. For example, if the predetermined period length is one week, the counted data is shown in Table 2 below.

TABLE 2

| Date | Data Size | Time Period | Total Data Size |
| --- | --- | --- | --- |
| 2016 Jul. 1 | 1.7 G | 1 | 12.6 G |
| 2016 Jul. 2 | 1.9 G | | |
| 2016 Jul. 3 | 1.6 G | | |
| 2016 Jul. 4 | 2.2 G | | |
| 2016 Jul. 5 | 1.9 G | | |
| 2016 Jul. 6 | 2.1 G | | |
| 2016 Jul. 7 | 1.2 G | | |
| 2016 Jul. 8 | 1.8 G | 2 | 12.7 G |
| 2016 Jul. 9 | 1.6 G | | |
| 2016 Jul. 10 | 1.8 G | | |
| 2016 Jul. 11 | 1.7 G | | |
| 2016 Jul. 12 | 1.7 G | | |
| 2016 Jul. 13 | 1.9 G | | |
| 2016 Jul. 14 | 2.2 G | | |
| . . . | . . . | . . . | . . . |

Further, in order to facilitate subsequent training of the neural network model, the data in Table 2 may be converted further after the counting is completed. For example, the data in Table 3 is converted into feature data and label data. The data amount of the time period t is used as the feature data input to the neural network; and the data amount of the time period t+1 is used as the label data for comparison with the predicted value output by the neural network model. The converted data is shown in Table 3 below.

TABLE 3

| Feature Data | Label Data |
| --- | --- |
| 12.6 G | 12.7 G |
| 12.7 G | . . . |
| . . . | . . . |

Further, Table 3 is converted into a matrix:

$$A = \begin{bmatrix} b1 & b2 \\ b2 & b3 \\ \cdots & \cdots \\ b_t & b_{t+1} \end{bmatrix}.$$

$b_t$ represents a data amount of the time period t; matrix A identifies a row and column structure for training the data; and the data in Table 3 is saved to a target file according to the data structure of the matrix A. For example, the target file is a csv format file, and the data of the csv file is shown in Table 4.

TABLE 4

| | |
| --- | --- |
| 1 | 12.6, 12.7 |
| 2 | 12.7, 12.8 |
| 3 | 12.8, 12.9 |
| 4 | 12.9, 13.1 |
| 5 | 13.1, 13.2 |
| 6 | 13.2, 13.3 |
| 7 | 13.3, 13.3 |
| 8 | 13.3, 13.4 |
| 9 | 13.4, 13.5 |
| 10 | 13.5, 13.4 |
| 11 | 13.4, 13.4 |
| 12 | 13.4, 13.4 |
| 13 | 13.4, 13.4 |
| 14 | 13.4, 13.4 |
| 15 | 13.4, 13.4 |
| 16 | 13.4, 13.4 |
| 17 | 13.4, 13.3 |
| 18 | 13.3, 13.3 |
| 19 | 13.3, 13.2 |
| 20 | 13.2, 13.1 |
| 21 | 13.1, 13.1 |
| 22 | 13.1, 13.0 |
| 23 | 13.0, 13.0 |
| 24 | 13.0, 13.0 |
| 25 | 13.0, 12.9 |
| 26 | 12.9, 12.9 |
| 27 | 12.9, 12.9 |
| 28 | 12.9, 13.0 |
| 29 | 13.0, 13.0 |
| 30 | 13.0, 13.1 |
| 31 | 13.1, 13.2 |
| 32 | 13.2, 13.2 |
| 33 | 13.2, 13.3 |
| 34 | 13.3, 13.3 |
| 35 | 13.3, 13.4 |
| 36 | 13.4, 13.4 |
| 37 | 13.4, 13.5 |
| 38 | 13.5, 13.4 |
| 39 | 13.4, 13.4 |
| 40 | 13.4, 13.3 |
| 41 | 13.3, 13.3 |
| 42 | 13.3, 13.2 |
| 43 | 13.2, 13.1 |
| 44 | 13.1, 13.1 |
| 45 | 13.1, 13.0 |
| 46 | 13.0, 13.0 |
| 47 | 13.0, 12.9 |
| 48 | 12.9, 12.9 |
| 49 | 12.9, 12.6 |
| 50 | 12.6, 12.6 |
| 51 | 12.6, 12.5 |
| 52 | 12.5, 12.5 |
| 53 | 12.5, 12.4 |
| 54 | 12.4, 12.4 |
| 55 | 12.4, 12.3 |
| 56 | 12.3, 12.3 |
| 57 | 12.3, 12.2 |
| 58 | 12.2, 12.2 |
| 59 | 12.2, 12.1 |
| 60 | 12.1, 12.1 |

TABLE 4-continued

| 61 | 12.1, 12.0 |
| 62 | 12.0, 12.1 |
| 63 | 12.1, 12.1 |
| 64 | 12.1, 12.2 |
| 65 | 12.2, 12.2 |
| 66 | 12.2, 12.1 |
| 67 | 12.1, 12.1 |
| 68 | 12.1, 12.1 |
| 69 | 12.1, 12.0 |
| 70 | 12.0, 12.0 |
| 71 | 12.0, 11.9 |
| 72 | 11.9, 11.9 |
| 73 | 11.9, 11.8 |
| 74 | 11.8, 11.8 |
| 75 | 11.8, 11.7 |
| 76 | 11.7, 11.7 |
| 77 | 11.7, 11.7 |
| 78 | 11.7, 11.6 |
| 79 | 11.6, 11.6 |
| 80 | 11.6, 11.5 |
| 81 | 11.5, 11.6 |
| 82 | 11.6, 11.5 |
| 83 | 11.5, 11.4 |
| 84 | 11.4, 11.3 |
| 85 | 11.3, 11.2 |
| 86 | 11.2, 11.2 |

Further, the data stored in the target file may also be loaded and preprocessed. That is, the data is normalized to be converted into the same data range, so as to prevent neurons in the neural network from generating too high or too low values when values of the data is too large or small. For example, when the neurons adopt the sigmoid function as the activation function $$f(x) = \frac{1}{1 + e^{-x}},$$

the too large or too small values will cause derivatives of neurons to approach zero, thereby adversely affecting the training results. Data preprocessing can normalize the data between 0 and 1. The following formula (2) is used for data preprocessing:

$$X_{normal} = \frac{X - X_{min}}{X_{max} - X_{min}}. \qquad (2)$$

X represents the data to be processed; $X_{max}$ is the maximum value and $X_{min}$ is the minimum value; and $X_{normal}$ represents the normalized data.

After that, it is necessary to construct a neural network model. The construction process generally includes: setting a weight of the neural network model, selecting a weight updater, determining the number of layers of the neural network model, determining the number of nodes in each layer, selecting a loss function and an activation function which are to be adopted, and performing other operations.

In a possible embodiment, a group of smaller random numbers is randomly generated as initial weights of the neural network model; the random gradient descent method is adopted to optimize a cost function, and an error is reversely transmitted accordingly; and the weight and thresholds in the neural network model are adjusted constantly. The XAVIER strategy is selected as the initial strategy of the weights.

The weight updater includes two parameters, namely, a learning rate and a momentum, wherein the learning rate represents an adjustment range of the weight in each iteration; and the momentum can influence the direction of the weight adjustment. Finding suitable parameters to determine a suitable weight updater can effectively improve convergence, thereby preventing the neural network model from falling into a local minimum.

In the embodiment of the present disclosure, as the data amount is only a factor affecting the neural network model, a three-layer neural network is constructed, and is as shown in FIG. 1. The first layer is the input layer configured to receive the input data and transmit the received data to the next layer, and can receive the input data by a single node. The second layer is the hidden layer configured to construct the LSTM network; and the number of nodes in the hidden layer is determined by the Kolmogorov theorem which includes s=2*n+1, wherein s represents the number of hidden nodes and n represents the number of nodes in the input layer. The third layer is the output layer, and is configured to output a predicted value by a single node.

As an example, the loss function in the neural network model is a common mean square error function in regression, and the activation function is an IDENTITY function.

After constructing the neural network model, it is necessary to load the preprocessed data into the neural network model to train the neural network model, so as to obtain the target network model. It should be noted that as the LSTM network model needs information with time series, it is required to add a time dimension to the preprocessed data. For example, the serial numbers in Table 4 are used as the time series input into the neural network model. After inputting the time series and the preprocessed data into the neural network model, the predicted value is output. The weight of the neural network model is adjusted according to the error between the predicted value and the actual value, the step of inputting the data is repeated, and the training ends until the error of the whole data sample set falls within the specified range, so as to obtain the target network model.

Further, after the target network model is obtained, the target network model is verified further. For example, it is assumed that the test data is as shown in Table 5, the test data further include feature data and label data. The test data is input into the target network model. A predicted value is output, and is compared with the label data to verify whether the predictive ability of the target network model achieves the expected effect.

TABLE 5

| 1 | 11.2, 11.2 |
| 2 | 11.2, 11.1 |
| 3 | 11.1, 11.0 |
| 4 | 11.0, 10.9 |
| 5 | 10.9, 10.9 |
| 6 | 10.9, 10.8 |
| 7 | 10.8, 10.7 |
| 8 | 10.7, 10.7 |
| 9 | 10.7, 10.7 |
| 10 | 10.7, 10.8 |
| 11 | 10.8, 11.0 |
| 12 | 11.0, 11.1 |
| 13 | 11.1, 11.2 |
| 14 | 11.2, 11.3 |
| 15 | 11.3, 11.4 |
| 16 | 11.4, 11.5 |
| 17 | 11.5, 11.6 |
| 18 | 11.6, 11.7 |
| 19 | 11.7, 11.8 |
| 20 | 11.8, 11.9 |
| 21 | 11.9, 12.0 |
| 22 | 12.0, 12.2 |

TABLE 5-continued

| 23 | 12.2, 12.3 |
| 24 | 12.3, 12.4 |
| 25 | 12.4, 12.5 |
| 26 | 12.5, 12.4 |
| 27 | 12.4, 12.6 |
| 28 | 12.6, 12.7 |
| 29 | 12.7, 12.8 |
| 30 | 12.8, 13.0 |
| 31 | 13.0, 13.1 |
| 32 | 13.1, 13.2 |
| 33 | 13.2, 13.3 |
| 34 | 13.3, 13.5 |
| 35 | 13.5, 13.6 |
| 36 | 13.6, 13.7 |
| 37 | 13.7, 13.7 |
| 38 | 13.7, 13.6 |
| 39 | 13.6, 13.5 |
| 40 | 13.5, 13.7 |
| 41 | 13.7, 13.6 |
| 42 | 13.6, 13.5 |
| 43 | 13.5, 13.7 |
| 44 | 13.7, 13.4 |
| 45 | 13.4, 13.3 |
| 46 | 13.3, 13.3 |
| 47 | 13.3, 13.4 |
| 48 | 13.4, 13.4 |
| 49 | 13.4, 13.6 |
| 50 | 13.6, 13.7 |
| 51 | 13.7, 13.8 |
| 52 | 13.8, 13.8 |
| 53 | 13.8, 13.9 |
| 54 | 13.9, 14.1 |
| 55 | 14.1, 14.0 |
| 56 | 14.0, 14.0 |
| 57 | 14.0, 14.1 |
| 58 | 14.1, 14.2 |
| 59 | 14.2, 14.4 |
| 60 | 14.4, 14.5 |
| 61 | 14.5, 14.6 |
| 62 | 14.6, 14.8 |
| 63 | 14.8, 15.0 |
| 64 | 15.0, 15.1 |
| 65 | 15.1, 15.3 |
| 66 | 15.3, 15.4 |
| 67 | 15.4, 15.5 |
| 68 | 15.5, 15.7 |
| 69 | 15.7, 15.8 |
| 70 | 15.8, 16.0 |
| 71 | 16.0, 16.2 |
| 72 | 16.2, 16.3 |
| 73 | 16.3, 16.5 |
| 74 | 16.5, 16.6 |
| 75 | 16.6, 16.8 |
| 76 | 16.8, 17.0 |
| 77 | 17.0, 17.2 |
| 78 | 17.2, 17.3 |
| 79 | 17.3, 17.5 |
| 80 | 17.5, 17.7 |
| 81 | 17.7, 17.8 |
| 82 | 17.8, 18.0 |
| 83 | 18.0, 18.2 |
| 84 | 18.2, 18.4 |
| 85 | 18.4, 18.5 |
| 86 | 18.5, 18.7 |
| 87 | 18.7, 18.9 |
| 88 | 18.9, 19.1 |
| 89 | 19.1, 18.7 |
| 90 | 18.7, 18.6 |
| 91 | 18.6, 18.8 |
| 92 | 18.8, 19.0 |
| 93 | 19.0, 19.1 |
| 94 | 19.1, 18.7 |
| 95 | 18.7, 18.8 |
| 96 | 18.8, 18.6 |

Figure 3:
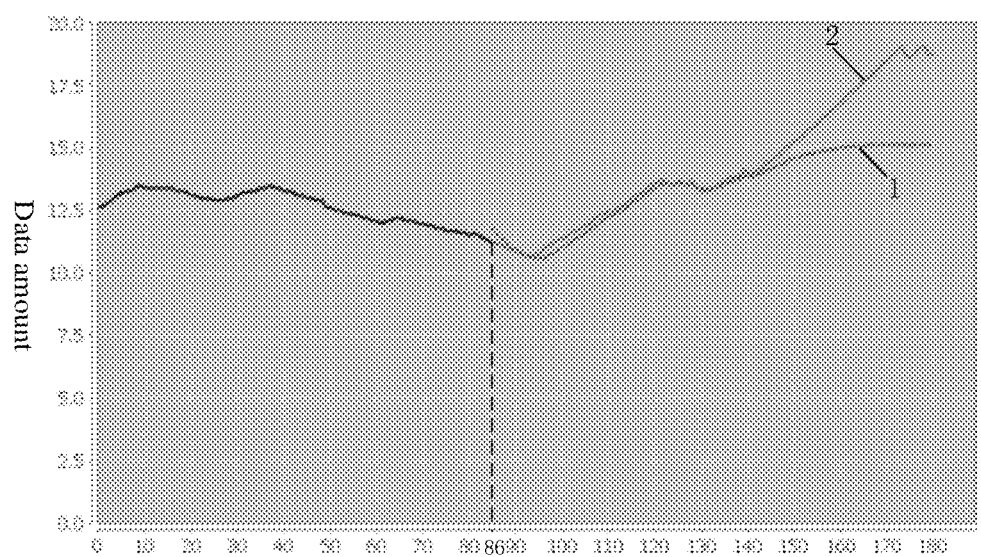
FIG. 3 is a schematic diagram of data comparison according to another embodiment.

The predicted value output by the target network model is compared with the label data in the test data, and a comparison diagram obtained by a tracing point method is shown in FIG. 3. In FIG. 3, the data amount within the time period of [1, 86] is the real data for training the neural network model. In the time period beyond the range, the data amount corresponding to curve 1 is the predicted value output by the target network model, and the data amount corresponding to curve 2 is the real data amount or label data in the test data. In FIG. 3, a difference between the predicted value and the label data in the test data can be found visually in the comparison. When the two values are close, it can be determined that the target network model meets an actual demand, that is, the data amount in the target time period can be successfully predicted.

It should also be noted that, as can be seen from FIG. 3, the predicted value and the label data are relatively close at the beginning, but the difference between the two gradually increases over time. This is because in each of the time periods after the time period 86, only the data amount of the next time period is predicted by the target network model, but the target network model is not trained based on the data amount of the time period after the time period 86. In other words, the target network model can generally accurately predict the data amount of the next time period nearest to the current time period, but there is a difference between the predicted value and the real value of the data amount in the time period farther from the current time period. Therefore, in order to ensure the prediction accuracy of the target network model, the data in the csv file can be updated based on the data of the target time period while predicting the data amount every time. In addition, the training of the target network model continues based on the updated data, so as to enable the predictive ability of the target network model to be more accurate.

In step 204, the computer device determines the number of target regions based on the third data amount within the target time period.

In a possible embodiment, based on the third data amount within the target time period, the number of target regions is determined by formula (1):

$$k = \left\lceil \frac{n}{m} \right\rceil. \tag{1}$$

Here, k is the number of target regions; n is the third data amount within the target time period, m indicates the maximum storage capacity of a single region, and "⌈ ⌉" represents a rounding-up operation.

In addition, m is set according to actual requirements. For example, if the optimal storage range of a single region is [5 G, 10 G], 10 G is selected as the upper storage limit of the single region. That is, the value of m is selected as 10 G. Further, it is assumed that the third data amount n determined through the target network model is 100 G, it can be determined that the number of target regions is 10.

In step 205, the computer device partitions, based on the number of target regions, a space in the database table configured to storing the data to be stored.

Continuing to take the above example for illustration, the time period corresponding to the space for storing the data to be stored is 20180901-20180907. When the number of target regions is 10, the space corresponding to the time period 20180901-20180907 is partitioned into 10 regions. That is, when storing the data in the time period 20180901-20180907, the data is stored in the 10 regions.

In this way, before storing the data, the data amount to be stored is predicted first, and the space prepared for storing the data to be stored in the database table is partitioned according to the data amount, such that costly splitting of the data when writing into the database table is avoided, thereby ensuring that the optimal load balancing effect is achieved, and enabling the operation of the storage system to be more stable.

Further, after performing space partitioning on the database table, the computer device can also judge whether the database table needs to be partitioned continuously. When it is determined that the partitioning needs to be continued, step 202 is performed again to continue to partition the space corresponding to the next time period of the target time period according to the above implementation process.

Further, the process of judging whether the database table needs to be partitioned continuously may include: judging whether the target time period exceeds a deadline date of the database table, wherein the deadline date is configured to indicate the deadline for storing the data in the database table; and when the target time period exceeds the deadline date, it is determined that there is no need to continue partitioning. Otherwise, when the target time period does not exceed the deadline date, it is determined that the partitioning needs to be continued.

That is, the database table is generally configured with the deadline date. For example, the deadline date is Jan. 1, 2019, which means that the data after Jan. 1, 2019 is not stored in the database table. If the target time period is 20180901-20180907, it means that the deadline date is not exceeded, and it is determined that the partitioning needs to be continued at this time. If the target time period is 20190901-20190907, it means that the deadline is exceeded, and it is determined that there is no need to continue the partitioning.

In the embodiments of the present disclosure, a first data amount within a first time period of a database table and a second data amount within a second time period of the database table are determined, the first time period and the second time period are prior to a target time period corresponding to data to be stored. The first data amount and the second data amount are input into a target network model, and a third data amount within the target time period is output. That is, the data amount within the target time period is predicted by the target network model. Thus, a number of target regions is determined based on the predicted third data amount, and a space in the database table configured to store the data to be stored is partitioned based on the number of target regions. In other words, a data amount of data to be stored in a time period is predicted before storing the data, and then space partitioning is performed based on the predicted data amount, which avoids necessary data migration when space partitioning is performed in a fixed manner, thereby improving data storage performance.

Figure 4:
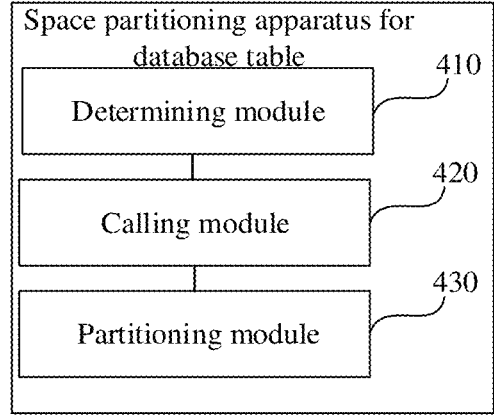
FIG. 4 is a schematic structural diagram of a space partitioning apparatus for a database table according to an embodiment.

FIG. 4 is a structural schematic diagram of a space partitioning apparatus for a database table according to an example embodiment. The apparatus may be practiced by hardware, software or a combination thereof, and may include:

a determining module 410, configured to determine a first data amount within a first time period and a second data amount within a second time period of the database table, wherein the first time period and the second time period are prior to a target time period corresponding to data to be stored;

a calling module 420, configured to call a target network model, input the first data amount and the second data amount into the target network model, and output a third data amount within the target time period, wherein the target network model is configured to predict a data amount of a next time period based on data amounts of a previous time period and a current time period; and a partitioning module 430, configured to determine a number of target regions based on the third data amount within the target time period, and partition, based on the number of target regions, a space in the database table configured to store the data to be stored.

Optionally, the first and second time periods are adjacent ones, and the first time period is a previous time period of the target time period.

Figure 5:
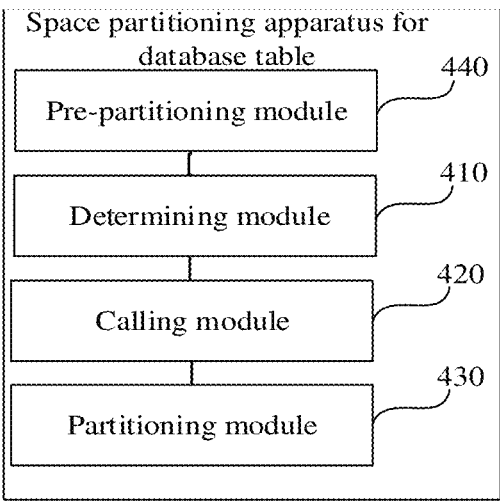
FIG. 5 is a schematic structural diagram of a space partitioning apparatus for a database table according to another embodiment.

Optionally, referring to FIG. 5, the apparatus further includes:

a pre-partitioning module 440, configured to acquire a plurality of groups of data by pre-partitioning, based on a time stamp of data in the database table, the data in the database table according to a predetermined period length;

wherein the determining module 410 is configured to determine the first data amount within the first time period and the second data amount within the second time period of the database table by counting a data amount in the first time period and counting a data amount in the second time period from the plurality of groups of data.

Optionally, the partitioning module 430 is configured to: determine the number of target regions by formula:

$$k = \lceil \frac{n}{m} \rceil$$

based on the third data amount within the target time period; wherein k is the number of target regions, n is the third data amount within the target time period, m indicates a maximum storage capacity of a single area, and "⌈ ⌉" represents a rounding-up operation.

Optionally, the target network model is obtained by training a neural network model based on a data amount within a plurality of time periods and a data amount of one time period after each of the plurality of time periods.

In the embodiments of the present disclosure, a first data amount within a first time period and a second data amount within a second time period of the database table are determined, the first time period and the second time period are prior to a target time period corresponding to data to be stored. The first data amount and the second data amount are input into a target network model, and a third data amount within the target time period is output. That is, the data amount within the target time period is predicted by the target network model. Thus, a number of target regions is determined based on the predicted third data amount, and a space in the database table configured to store the data to be stored is partitioned based on the number of target regions. In other words, a data amount of data to be stored in a time period is predicted before storing the data, and then space partitioning is performed based on the predicted data amount, which avoids necessary data migration when space partitioning is performed in a fixed manner, thereby improving data storage performance.

It should be noted that the space partitioning apparatus for the database table according to this embodiment is illustrated by only taking division of all the functional modules as an example during space partitioning of a database table. In practice, the functions may be implemented by the different functional modules as required. That is, the apparatus is divided into different functional modules to implement all or part of the functions described above. In addition, the apparatus according to this embodiment is based on the same inventive concept as the method according to the above embodiments. For details, reference may be made to the method embodiments, which is not described herein any further.

Figure 6:
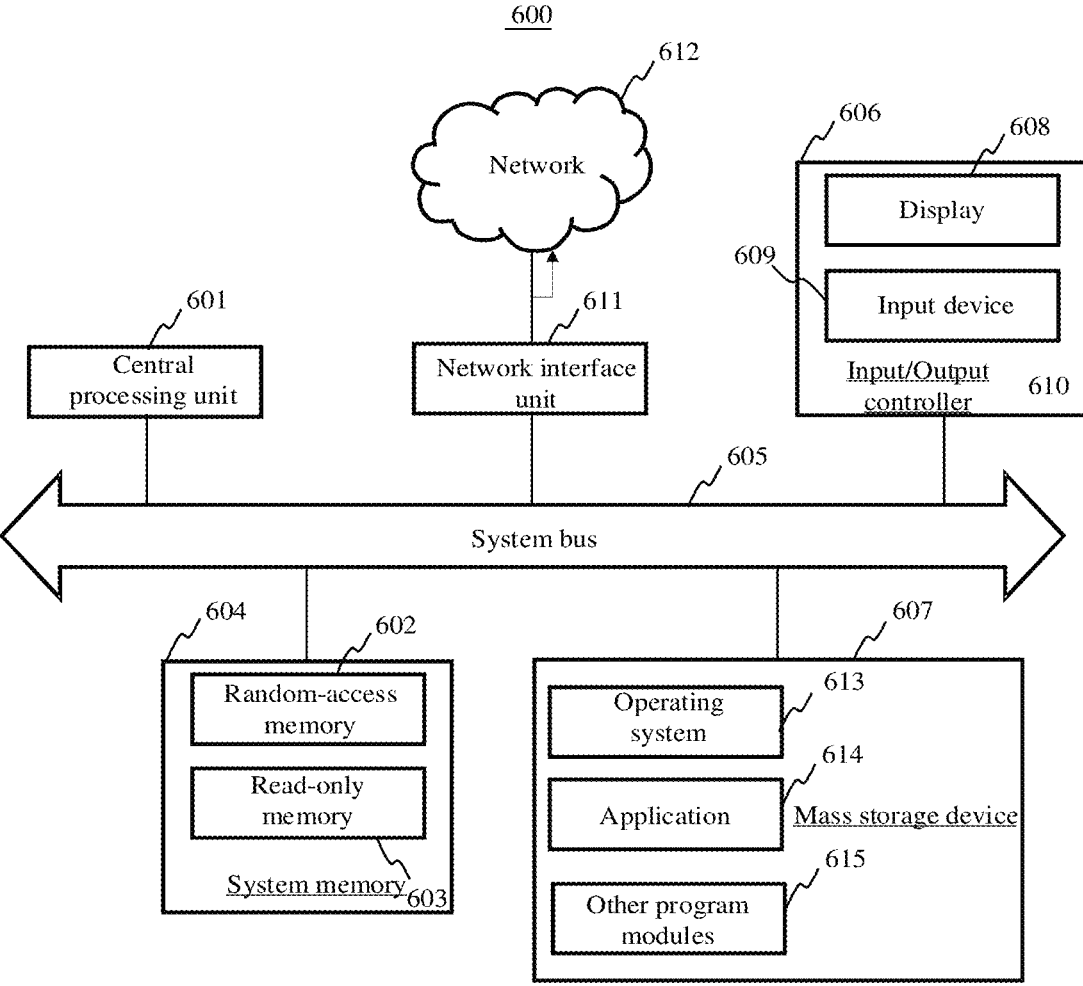
FIG. 6 is a schematic structural diagram of a computer device according to an embodiment.

FIG. 6 is a schematic diagram of a structure of a computer device according to an example embodiment.

Specifically, the computer device 600 includes a central processing unit (CPU) 601, a system memory 604 including a random-access memory (RAM) 602 and a read-only memory (ROM) 603, and a system bus 605 that connects the system memory 604 and the central processing unit 601. The computer device 600 further includes a basic input/output system (I/O system) 606 that facilitates to transfer the information between respective units within the computer, and a mass storage device 607 for storing an operating system 613, an application 614, and other program modules 615.

The basic input/output system 606 includes a display 608 for displaying the information and an input device 609, such as a mouse or keyboard, for the user to input information. The display 608 and the input device 609 are both connected to the CPU 601 via an input output controller 610 that is connected to the system bus 605. The basic I/O system 606 may further include an input output controller 610 for receiving and processing the input from a plurality of other devices, such as a keyboard, mouse, or electronic stylus. Similarly, the input and output controller 610 further provides output to a display screen, a printer, or other types of output devices.

The mass storage device 607 is connected to the CPU 601 by a mass storage controller (not shown) connected to the system bus 605. The mass storage device 607 and the related computer readable mediums provide non-volatile storage for the computer device 600. That is, the mass storage device 607 may include a computer readable medium (not shown), such as, a hard disk or a compact disc read-only memory (CD-ROM) drive.

Without loss of generality, the computer-readable medium may include a computer storage medium and a communication medium. The computer storage medium includes volatile and nonvolatile, removable and non-removable mediums implemented by any method or technology for storing the information, such as, computer readable instructions, data structures, program modules or other data. The computer storage medium includes a RAM, a ROMs, an erasable programmable read-only memory (EPROM), an electrically erasable programmable read-only memory (EEPROM), a flash memory or other solid-state storage devices, a CD-ROM, a digital versatile disc (DVD) or other optical storage devices, a tape cartridge, a magnetic tape, a magnetic disk storage device or other magnetic storage devices. A person skilled in the art appreciates that the computer storage medium is not limited to the above ones. The aforesaid system memory 604 and mass storage device 607 may be collectively referred to as a memory.

According to various embodiments of the present disclosure, the computer device 600 may also be connected to a remote computer on a network over the network, such as the Internet, for operation. That is, the computer device 600 may be connected to the network 612 through a network interface unit 611 connected to the system bus 605, or may be connected to other types of networks or remote computer systems (not shown) with the network interface unit 611.

The memory further includes one or more programs stored in the memory and to be executed by the CPU. The one or more programs include the space partitioning method for the database table according to the embodiments of the present disclosure.

Embodiments of the present disclosure further provide a non-transitory computer-readable storage medium. When being executed by a processor of a computer device, the space partitioning method for the database table according to the embodiments of the present disclosure can be performed by the computer device.

Embodiments of the present disclosure further provide a computer program product, which, when running in a computer, causes the computer to execute the space partitioning method for the database table according to the embodiments of the present disclosure.

It may be understood by an ordinary person skilled in the art that all or part of steps in the above embodiments may be performed by hardware or by a program instructing relevant hardware. The program may be stored in a computer-readable storage medium such as a ROM, a magnetic disk, an optical disc, or the like.

Described above are only preferred embodiments of the present disclosure, which are not intended to limit the present disclosure. Any modifications, equivalent replacements, improvements and the like made within the spirit and principles of the present disclosure should be included within the scope of protection of the present disclosure.

What is claimed is:

1. A space partitioning method for a database table, comprising:

acquiring a plurality of groups of data by partitioning, based on a time stamp of data in the database table, the data in the database table according to a predetermined period length, wherein each group of data corresponds to one partitioning region;

partitioning each partitioning region again to acquire a plurality of sub-regions corresponding to each partitioning region, wherein a number of the plurality of sub-regions corresponding to each partitioning region is as same as that of storage nodes in a database, and each of the plurality of sub-regions is distributed to each of the storage nodes in the database;

determining a first data amount within a first time period and a second data amount within a second time period of the database table by counting a data amount in the first time period and counting a data amount in the second time period from the plurality of groups of data, wherein the first time period and the second time period are prior to a target time period corresponding to data to be stored, the first time period and the second time period are adjacent ones, and the first time period is a previous time period of the target time period;

calling a target network model, inputting the first data amount and the second data amount into the target network model, and outputting a third data amount within the target time period, wherein the target network model is configured to predict a data amount of a next time period based on a data amount of the previous time period and a data amount of a current time period; and determining a number of regions into which space configured to store data to be stored in the database table is to be partitioned, based on the third data amount within the target time period, and partitioning, based on the number of the regions, the space.

2. The method according to claim 1, wherein determining the number of regions based on the third data amount within the target time period comprises:

determining the number of regions by formula:

$$k = \left\lceil \frac{n}{m} \right\rceil$$

based on the third data amount within the target time period;
    wherein k is the number of regions, n is the third data amount within the target time period, m indicates a maximum storage capacity of a single area, and "⌈ ⌉" represents a rounding-up operation.

3. The method according to claim 1, wherein the target network model is obtained by training a neural network model based on a data amount within a plurality of time periods and a data amount of one time period upon elapse of each of the plurality of time periods.

4. A space partitioning device for a database table, comprising:
      a processor and a memory configured to store a computer program, wherein the processor, when running the computer program, is caused to perform a space partitioning method for a database table comprising:
      acquiring a plurality of groups of data by partitioning, based on a time stamp of data in the database table, the data in the database table according to a predetermined period length, wherein each group of data corresponds to one partitioning region;
      partitioning each partitioning region again to acquire a plurality of sub-regions corresponding to each partitioning region, wherein a number of the plurality of sub-regions corresponding to each partitioning region is as same as that of storage nodes in a database, and each of the plurality of sub-regions is distributed to each of the storage nodes in the database;
      determining a first data amount within a first time period and a second data amount within a second time period of the database table by counting a data amount in the first time period and counting a data amount in the second time period from the plurality of groups of data, wherein the first time period and the second time period are prior to a target time period corresponding to data to be stored, the first time period and the second time period are adjacent ones, and the first time period is a previous time period of the target time period;
      calling a target network model, inputting the first data amount and the second data amount into the target network model, and outputting a third data amount within the target time period, wherein the target network model is configured to predict a data amount of a next time period based on a data amount of the previous time period and a data amount of a current time period; and
      determining a number of regions into which space configured to store data to be stored in the database table is to be partitioned, based on the third data amount within the target time period, and partitioning, based on the number of the regions, the space.

5. The device according to claim 4, wherein determining the number of regions based on the third data amount within the target time period comprises:
    determining the number of regions by formula:

$$k = \left\lceil \frac{n}{m} \right\rceil$$

based on the third data amount within the target time period;
    wherein k is the number of regions, n is the third data amount within the target time period, m indicates a maximum storage capacity of a single area, and "⌈ ⌉" represents a rounding-up operation.

6. The device according to claim 4, wherein the target network model is obtained by training a neural network model based on a data amount within a plurality of time periods and a data amount of one time period after each of the plurality of time periods.

7. A non-transitory computer-readable storage medium storing instructions therein, wherein the instructions, when executed by a processor, causes the processor to perform a space partitioning method for a database table, comprising:
      acquiring a plurality of groups of data by partitioning, based on a time stamp of data in the database table, the data in the database table according to a predetermined period length, wherein each group of data corresponds to one partitioning region;
      partitioning each partitioning region again to acquire a plurality of sub-regions corresponding to each partitioning region, wherein a number of the plurality of sub-regions corresponding to each partitioning region is as same as that of storage nodes in a database, and each of the plurality of sub-regions is distributed to each of the storage nodes in the database;
      determining a first data amount within a first time period and a second data amount within a second time period of the database table by counting a data amount in the first time period and counting a data amount in the second time period from the plurality of groups of data, wherein the first time period and the second time period are prior to a target time period corresponding to data to be stored, the first time period and the second time period are adjacent ones, and the first time period is a previous time period of the target time period;
      calling a target network model, inputting the first data amount and the second data amount into the target network model, and outputting a third data amount within the target time period, wherein the target network model is configured to predict a data amount of a next time period based on a data amount of the previous time period and a data amount of a current time period; and
      determining a number of regions into which space configured to store data to be stored in the database table is to be partitioned, based on the third data amount within the target time period, and partitioning, based on the number of the regions, the space.

8. The non-transitory computer-readable storage medium according to claim 7, wherein determining the number of regions based on the third data amount within the target time period comprises:
    determining the number of regions by formula:

$$k = \left\lceil \frac{n}{m} \right\rceil$$

based on the third data amount within the target time period;
    wherein k is the number of regions, n is the third data amount within the target time period, m indicates a maximum storage capacity of a single area, and "⌈ ⌉" represents a rounding-up operation.

9. The non-transitory computer-readable storage medium according to claim 7, wherein the target network model is obtained by training a neural network model based on a data amount within a plurality of time periods and a data amount of one time period upon elapse of each of the plurality of time periods.

10. A computer device comprising a processor and a memory configured to store a computer program, wherein the processor, when running the computer program, is caused to perform a space partitioning method for a database table, comprising:

acquiring a plurality of groups of data by partitioning, based on a time stamp of data in the database table, the data in the database table according to a predetermined period length, wherein each group of data corresponds to one partitioning region;

partitioning each partitioning region again to acquire a plurality of sub-regions corresponding to each partitioning region, wherein a number of the plurality of sub-regions corresponding to each partitioning region is as same as that of storage nodes in a database, and each of the plurality of sub-regions is distributed to each of the storage nodes in the database;

determining a first data amount within a first time period and a second data amount within a second time period of the database table by counting a data amount in the first time period and counting a data amount in the second time period from the plurality of groups of data, wherein the first time period and the second time period are prior to a target time period corresponding to data to be stored, the first time period and the second time period are adjacent ones, and the first time period is a previous time period of the target time period;

calling a target network model, inputting the first data amount and the second data amount into the target network model, and outputting a third data amount within the target time period, wherein the target network model is configured to predict a data amount of a next time period based on a data amount of the previous time period and a data amount of a current time period; and determining a number of regions into which space configured to store data to be stored in the database table is to be partitioned, based on the third data amount within the target time period, and partitioning, based on the number of the regions, the space.

11. The computer device according to claim 10, wherein determining the number of regions based on the third data amount within the target time period comprises:

determining the number of regions by formula:

$$k = \left\lceil \frac{n}{m} \right\rceil$$

based on the third data amount within the target time period;

wherein k is the number of regions, n is the third data amount within the target time period, m indicates a maximum storage capacity of a single area, and "⌈ ⌉" represents a rounding-up operation.

12. The computer device according to claim 10, wherein the target network model is obtained by training a neural network model based on a data amount within a plurality of time periods and a data amount of one time period upon elapse of each of the plurality of time periods.

* * * * *